(12) United States Patent
Lahtinen et al.

(10) Patent No.: US 10,006,718 B2
(45) Date of Patent: *Jun. 26, 2018

(54) METHOD AND ARRANGEMENT FOR FEEDING FINE-GRAINED MATTER TO A CONCENTRATE OR MATTE BURNER OF A SUSPENSION SMELTING FURNACE

(71) Applicant: Outotec (Finland) Oy, Espoo (FI)

(72) Inventors: Markku Lahtinen, Espoo (FI); Tapio Ahokainen, Helsinki (FI); Peter Björklund, Espoo (FI)

(73) Assignee: Outotec (Finland) Oy, Espoo (FI)

( * ) Notice: Subject to any disclaimer, the term of this patent is extended or adjusted under 35 U.S.C. 154(b) by 206 days.

This patent is subject to a terminal disclaimer.

(21) Appl. No.: 14/421,966

(22) PCT Filed: Aug. 19, 2013

(86) PCT No.: PCT/FI2013/050811
§ 371 (c)(1),
(2) Date: Feb. 16, 2015

(87) PCT Pub. No.: WO2014/029913
PCT Pub. Date: Feb. 27, 2014

(65) Prior Publication Data
US 2015/0233643 A1    Aug. 20, 2015

(30) Foreign Application Priority Data

Aug. 20, 2012   (FI) ...................................... 20125863

(51) Int. Cl.
*B65G 43/08*      (2006.01)
*F27D 21/00*      (2006.01)
(Continued)

(52) U.S. Cl.
CPC ......... *F27D 99/0003* (2013.01); *B65G 37/00* (2013.01); *B65G 43/08* (2013.01);
(Continued)

(58) Field of Classification Search
CPC .... B65G 37/00; B65G 43/08; C22B 15/0052; F27B 1/20; F27D 21/00; F27D 3/0024;
(Continued)

(56) References Cited

U.S. PATENT DOCUMENTS 4,419,036 A * 12/1983 Beckenbach ............. F27B 1/20
266/176
2004/0025762 A1   2/2004 Cabrera-Llanos et al.
(Continued)

FOREIGN PATENT DOCUMENTS

CN   101575057 A   11/2009
CN   202485467 U   10/2012
(Continued)

OTHER PUBLICATIONS

Supplementary European Search Report prepared by the European Patent Office for EP 13830346, dated Mar. 8, 2016, 3 pages.
(Continued)

*Primary Examiner* — Jessee Roe
*Assistant Examiner* — Michael Aboagye
(74) *Attorney, Agent, or Firm* — Chernoff Vilhauer LLP

(57) ABSTRACT

An arrangement for feeding fine-grained matter to a concentrate or matte burner (1) of a suspension smelting furnace (2). The arrangement comprising a fluidization arrangement (3) for feeding fluidized fine-grained matter into a dosing bin (4), and a conveyor means (6) for feeding fluidized fine-grained matter from the dosing bin (4) to the concentrate or matte burner (1) of the suspension smelting furnace (2), and a loss-in-weight controller (5) between the dosing bin (4) and the conveyor means (6). The arrangement comprises an
(Continued)

impact cone (8) arranged below a filling valve (7) between the fluidization arrangement (3) and the dosing bin (4) for distributing fluidized fine-grained matter flowing from the fluidization arrangement (3) within the dosing bin (4).

10 Claims, 3 Drawing Sheets

(51) Int. Cl.
  *F27B 1/20* (2006.01)
  *B65G 37/00* (2006.01)
  *C22B 15/00* (2006.01)
  *F27D 3/18* (2006.01)
  *F27D 99/00* (2010.01)
  *F27D 3/00* (2006.01)

(52) U.S. Cl.
  CPC ............ *C22B 15/0052* (2013.01); *F27B 1/20* (2013.01); *F27D 3/0024* (2013.01); *F27D 3/0025* (2013.01); *F27D 3/0033* (2013.01); *F27D 3/18* (2013.01); *F27D 21/00* (2013.01); *F27D 99/0033* (2013.01)

(58) Field of Classification Search
  CPC ........ F27D 3/0025; F27D 3/0033; F27D 3/18; F27D 99/0003; F27D 99/0033
  USPC .......... 266/197, 265, 266, 267, 216; 75/386, 75/639, 649, 641, 643, 638, 659; 414/21, 414/171, 175, 197
  See application file for complete search history.

(56) References Cited

U.S. PATENT DOCUMENTS

2009/0226284 A1* 9/2009 Kojo ................... C22B 15/0047
                                                          414/161
2010/0284768 A1* 11/2010 Olin-nunez ............. C03B 5/235
                                                          414/161

FOREIGN PATENT DOCUMENTS

| GB | 1118354 | 7/1968 |
| GB | 1118354 A | 7/1968 |
| JP | Hei08-057331 A | 3/1996 |
| KR | 2006-0129260 A | 12/2006 |
| WO | 9963310 A1 | 12/1999 |
| WO | 2005067366 A2 | 7/2005 |

OTHER PUBLICATIONS

Notice of Grounds for Rejection prepared by the Korean Intellectual Property Office for KR 2015-7006901, dated Aug. 16, 2016, 2016, 10 pages
Search report from priority Finnish Application No. 20125863, dated Feb. 11, 2013, 1 pg.
Search report from priority International Application No. PCT/FI2013/050811, dated Nov. 8, 2013, 3 pgs.
Written Opinion from priority International Application No. PCT/FI2013/050811, dated Nov. 4, 2013, 5 pgs.
First Office Action from the State Intellectual Property Office of the People's Republic of China for CN201380043646.1, dated Oct. 10, 2015 (19 pages).

* cited by examiner

METHOD AND ARRANGEMENT FOR FEEDING FINE-GRAINED MATTER TO A CONCENTRATE OR MATTE BURNER OF A SUSPENSION SMELTING FURNACE

CROSS-REFERENCE TO RELATED APPLICATIONS

This is a national stage application filed under 35 USC 371 based on International Application No. PCT/FI2013/050811 filed Aug. 19, 2013 and claims priority under 35 USC 119 of Finnish Patent Application No. 20125863 filed Aug. 20, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The invention relates to a method for feeding fine-grained matter to a concentrate or matte burner of a suspension smelting furnace.

The invention also relates to an arrangement for feeding fine-grained matter to a concentrate or matte burner of a suspension smelting furnace.

The method and arrangement relates to feeding of fine-grained matter such as copper sulfide concentrate or copper matte and possible flux to a concentrate or matte burner of a suspension smelting furnace such as a flash smelting furnace or a direct-to-blister furnace.

Systems for feeding fine-grained matter to a concentrate or matte burner of a suspension smelting furnace are for example presented in publication WO 2005/067366.

OBJECTIVE OF THE INVENTION

The object of the invention is to provide an improved method and an improved arrangement for feeding fine-grained matter to a concentrate or matte burner of a suspension smelting furnace.

BRIEF SUMMARY OF THE INVENTION

The method for feeding fine-grained matter to a concentrate or matte burner of a suspension smelting furnace of the invention is described herein.

The method comprises additionally a first feeding step for feeding fine-grained matter into a fluidization arrangement.

The method comprises additionally a fluidization step for producing fluidized fine-grained matter with a fluidization arrangement.

The method comprises additionally a second feeding step for feeding fluidized fine-grained matter from the fluidization arrangement into a dosing bin that is located at a level below the fluidization arrangement The method comprises additionally a third feeding step for feeding fluidized fine-grained matter from the dosing bin to a conveyor means that is located at a level below the dosing bin and that is in communication with the concentrate or matte burner of the suspension smelting furnace for feeding fluidized fine-grained matter to the concentrate or matte burner of the suspension smelting furnace with the conveyor means. The method includes controlling the feeding of fluidized fine-grained matter from the dosing bin to the conveyor means by means of a loss-in-weight controller in the third feeding step The method comprises additionally determining the weight of the fluidized fine-grained matter in the dosing bin.

The arranging step of the method includes preferably, but not necessarily, supporting the impact cone at the filling valve between the fluidization arrangement and the dosing bin, preferably at a body structure of the filling valve. Supporting the impact cone from the filling valve reduces the disturbance the filling of the dosing bin with fluidized fine-grained matter from the fluidization arrangement has on the loss-in-weight controller. This makes measuring of the weight of the fluidized fine-grained matter with the loss-in-weight controller more accurate and easier.

The method comprises additionally arranging an impact cone arranged below the filling valve for distributing fluidized fine-grained matter flowing from the fluidization arrangement within the dosing bin.

The arrangement for feeding fine-grained matter to a concentrate or matte burner of a suspension smelting furnace of the invention is described herein.

In a preferred embodiment of the method, the arranging step of the method includes supporting the impact cone at the filling valve between the fluidization arrangement and the dosing bin for example at a body of the filling valve. If the impact cone is supported at the filling valve between the fluidization arrangement and the dosing bin, the impact cone can be supported by means of a metal support structure such as a steel support structure that is attached to a body structure of the filling valve. Another option if the impact cone is supported at the filling valve between the fluidization arrangement and the dosing bin, is to hang the impact cone by metal wires such as steel wires or by metal chains such as steel chains at a body structure of the filling valve.

In another preferred embodiment of the method, the method includes a recording step for by recording the actual filling time for filling the dosing bin, wherein the actual filling time is the time starting from opening of the filling valve and ending by closing the filling valve in the second feeding step, and a comparing step for comparing the recorded the actual filling time and a standard filling time for filling the dosing bin. In this preferred embodiment of the method of the invention, the fluidization step of the method may include increasing fluidization of the fine-grained matter if the recorded filling time is longer than the standard filling time. In this preferred embodiment of the method of the invention, the fluidization step of the method may decreasing fluidization of the fine-grained matter if the recorded filling time is shorter than the standard filling time.

The arrangement comprises feeding means for feeding fine-grained matter into the fluidization arrangement and a fluidization arrangement for producing fluidized fine-grained matter and for feeding fluidized fine-grained matter into a dosing bin that is located at a level below the fluidization arrangement.

In the arrangement the dosing bin is configured for feeding fluidized fine-grained matter to a conveyor means that is located at a level below the dosing bin and that is in communication with the concentrate or matte burner of the suspension smelting furnace for feeding fluidized fine-grained matter to the concentrate or matte burner of the suspension smelting furnace by means of the conveyor means.

The arrangement comprises a loss-in-weight controller between the dosing bin and the conveyor means for controlling the feeding of fluidized fine-grained matter to the conveyor means and weighting means for determining the weight of the fluidized fine-grained matter in the dosing bin.

The arrangement comprises an impact cone arranged below the filling valve for distributing fluidized fine-grained matter flowing from the fluidization arrangement within the dosing bin.

In a preferred embodiment of the arrangement, the impact cone is supported from the filling valve. Supporting the impact cone from the filling valve reduces the disturbance the filling of the dosing bin with fluidized fine-grained matter from the fluidization arrangement has on the loss-in-weight controller. This makes measuring of the weight of the fluidized fine-grained matter with the loss-in-weight controller more accurate and easier.

In another preferred embodiment of the arrangement, the impact cone may be supported from the filling valve and the cone may be arranged below the half of the height of the dosing bin.

In a preferred embodiment of the arrangement, the arrangement comprises recording means for recording the actual filling time for filling the dosing bin, wherein the actual filling time is the time starting from opening of the filling valve and ending by closing of the filling the valve, and the arrangement comprises comparing means for comparing the recorded the actual filling time and a standard filling time for filling the dosing bin. In this preferred embodiment of the arrangement, the fluidization means of the arrangement may be configured to increase fluidization of the fine-grained matter if the recorded filling time is longer than the standard filling time. In this preferred embodiment of the arrangement, the fluidization means of the arrangement may be configured to decrease fluidization of the fine-grained matter or to completely quit fluidization of the fine-grained matter if the recorded filling time is shorter than the standard filling time.

BRIEF DESCRIPTION OF THE SEVERAL VIEWS OF THE DRAWINGS

In the following the invention will described in more detail by referring to the figures, which

DETAILED DESCRIPTION OF THE INVENTION

Figure 1:
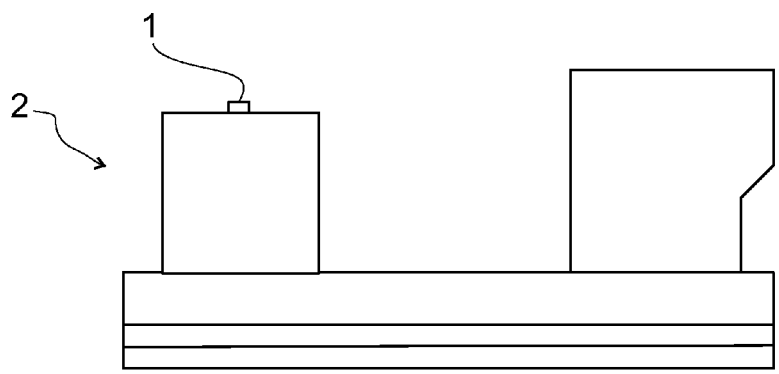
FIG. 1 shows a suspension smelting furnace.
Figure 2:
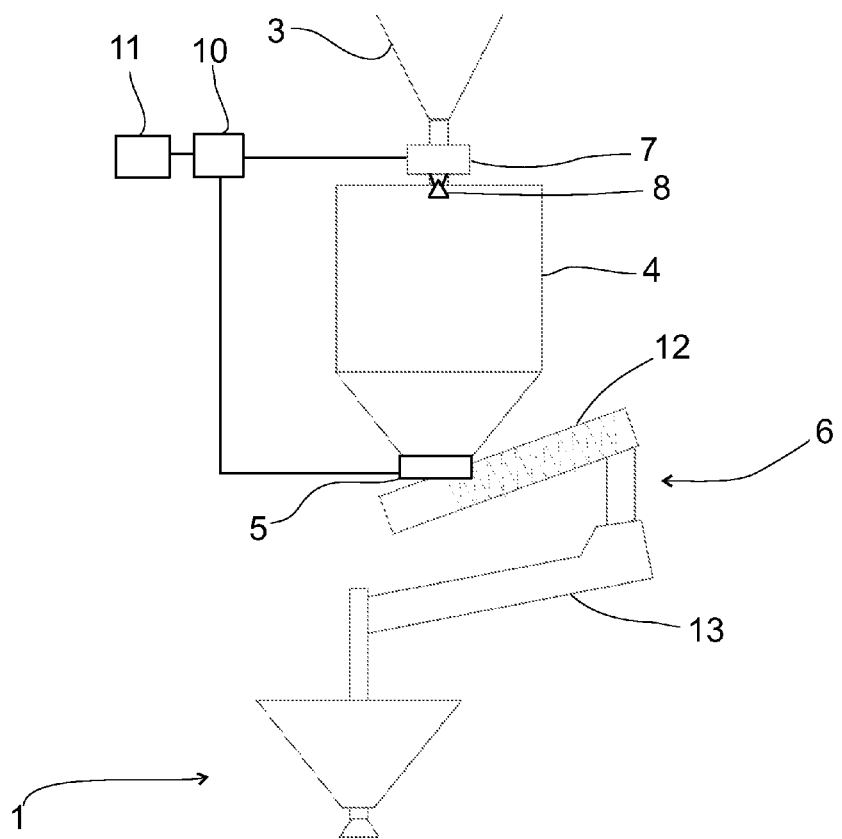
FIG. 2 shows a detail view of a preferred embodiment of the invention.
Figure 3:
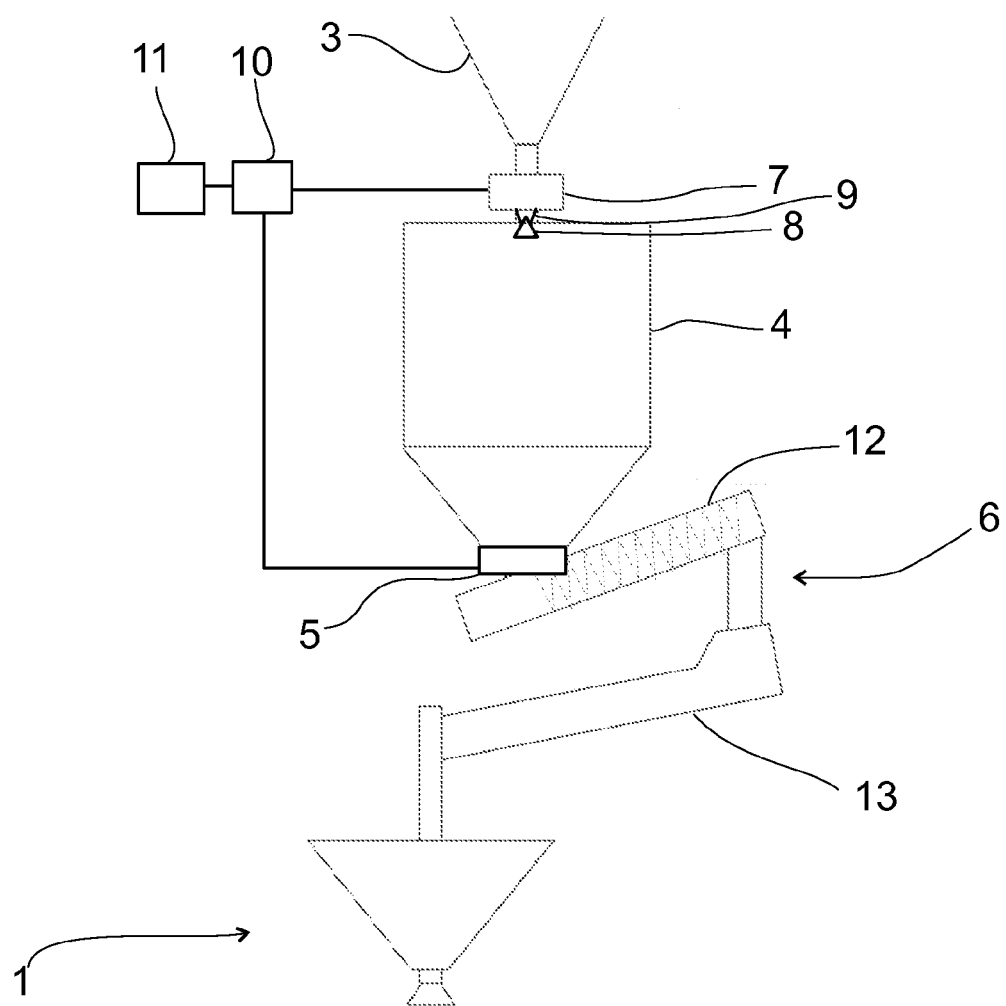
FIG. 3 shows a detail view of another preferred embodiment of the invention.

The invention relates method and to an arrangement for feeding fine-grained matter (not shown in the figures) to a concentrate or matte burner 1 of a suspension smelting furnace 2.

First the method for feeding fine-grained matter to a concentrate or matte burner 1 of a suspension smelting furnace 2 and some preferred embodiments and variants of the method will be described in greater detail.

The method comprises feeding first step for feeding fine-grained matter into a fluidization arrangement 3.

The method comprises a fluidization step for producing fluidized fine-grained matter with the fluidization arrangement 3.

The method comprises additionally a second feeding step for feeding fluidized fine-grained matter from the fluidization arrangement 3 into a dosing bin 4 that is located at a level below the fluidization arrangement 3.

The method comprises additionally a third feeding step for feeding fluidized fine-grained matter from the dosing bin 4 to a conveyor means 6 that is located at a level below the dosing bin 4 and that is in communication with the concentrate or matte burner 1 of the suspension smelting furnace 2 for feeding fluidized fine-grained matter to the concentrate or matte burner 1 of the suspension smelting furnace 2 with the conveyor means 6.

The method comprises additionally controlling the feeding of fluidized fine-grained matter from the dosing bin 4 to the conveyor means 6 by means of a loss-in-weight controller 5 in the third feeding step.

The third feeding step may include firstly feeding fluidized fine-grained matter from the dosing bin 4 to a screw conveyor 12 of the conveyor means 6 and subsequently feeding fluidized fine-grained matter from the screw conveyor 12 of the conveyor means 6 to an air-slide means 13 of the conveyor means and subsequently feeding fluidized fine-grained matter from the air-slide means 13 of the conveyor means to the concentrate or matte burner 1 of the suspension smelting furnace 2.

The second feeding step comprises opening a filling valve 7 between the fluidization arrangement 3 and the dosing bin 4 when the weight of the fluidized fine-grained matter in the dosing bin 4 goes below a pre-set low limit so as to let fluidized fine-grained matter to flow from the fluidization arrangement 3 into the dosing bin 4, and comprises subsequently closing the filling valve 7 when the weight of the fluidized fine-grained matter in the dosing bin 4 goes above a pre-set high limit. The second feeding step includes weighting the fluidized fine-grained matter in the dosing bin 4. The method may include the loss-in-weight controller 5 for determining the weight of the fine-grained matter in the dosing bin 4.

The method comprises additionally an arranging step for arranging an impact cone 8 arranged below the filling valve 7 for distributing fluidized fine-grained matter flowing from the fluidization arrangement 3 into the dosing bin 4.

The arranging step of the method includes preferably, but not necessarily, supporting the impact cone 8 at the filling valve 7 between the fluidization arrangement 3 and the dosing bin 4, preferably at a body structure (not marked with a reference numeral) of the filling valve 7. If the impact cone 8 is supported at the filling valve 7 between the fluidization arrangement 3 and the dosing bin 4, the impact cone 8 can be supported by means of a metal support structure 9 such as a steel support structure that is attached to a body structure of the filling valve 7. Another option if the impact cone 8 is supported at the filling valve 7 between the fluidization arrangement 3 and the dosing bin 4, is to hang the impact cone 8 by metal wires (not shown in the figures) such as steel wires or by metal chains such as steel chains at a body structure of the filling valve 7.

Figure 4:
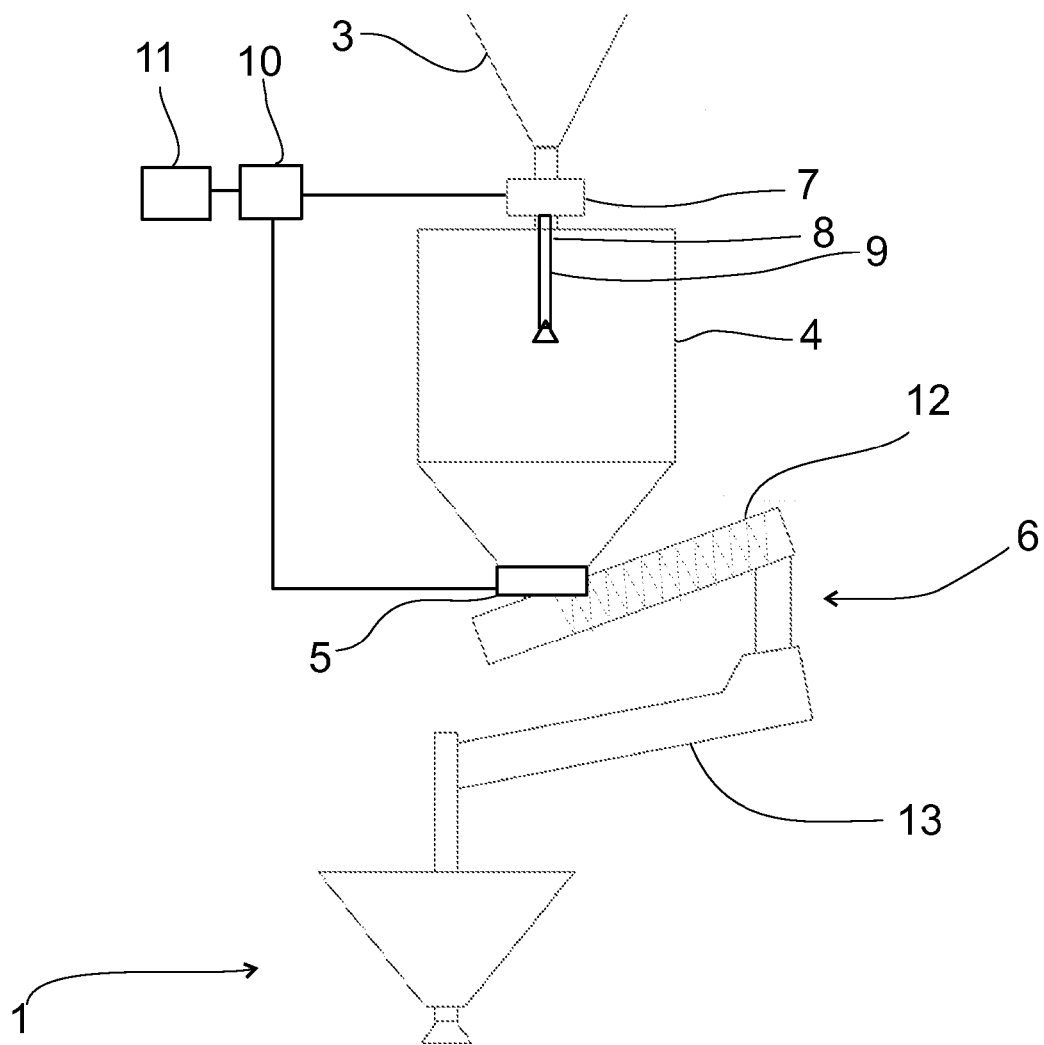
FIG. 4 shows a detail view of another preferred embodiment of the invention.

The arranging step of the method includes preferably, but not necessarily as shown in FIG. 4, supporting the impact cone 8 at the filling valve 7 between the fluidization arrangement 3 and the dosing bin 4 and arranging the impact cone 8 below the half of the height of the dosing bin 4.

The method may include a recording step for by recording the actual filling time for filling the dosing bin 4, wherein the actual filling time is the time starting from opening of the filling valve 7 and ending by closing the filling valve 7 in the second feeding step, and a comparing step for comparing the recorded the actual filling time and a standard filling time for filling the dosing bin 4.

If the method includes an above-described recording step and an above-described comparing step, the fluidization step of the method may include increasing fluidization of the fine-grained matter if the recorded filling time is longer than the standard filling time.

If the method includes an above-described recording step and an above-described comparing step, the fluidization step of the method may decreasing fluidization of the fine-grained matter if the recorded filling time is shorter that the standard filling time.

If the method includes an above-described recording comparing step and an above-described comparing step, the comparing step of the method may include using a pre-determined filling time as the average filling time.

If the method includes an above-described recording comparing step and an above-described comparing step, the comparing step of the method may include using as the standard filling time an average filling time calculated as the average filling time of several recorded actual filling times.

Next the arrangement for feeding fine-grained matter to a concentrate or matte burner 1 of a suspension smelting furnace 2 and some preferred embodiments and variants of the arrangement will be described in greater detail.

The arrangement comprises a fluidization arrangement 3 for producing fluidized fine-grained matter and for feeding fluidized fine-grained matter into a dosing bin 4 that is located at a level below the fluidization arrangement 3. The arrangement comprises feeding means for feeding fine-grained matter into the fluidization arrangement 3.

The dosing bin 4 is configured for feeding fluidized fine-grained matter to a conveyor means 6 that is located at a level below the dosing bin 4 and that is in communication with the concentrate or matte burner 1 of the suspension smelting furnace 2 for feeding fluidized fine-grained matter to the concentrate or matte burner 1 of the suspension smelting furnace 2 by means of the conveyor means 6.

The arrangement comprises a loss-in-weight controller 5 between the dosing bin 4 and the conveyor means 6 for controlling the feeding of fluidized fine-grained matter to the conveyor means 6.

The arrangement comprises weighting means for determining the weight of the fluidized fine-grained matter in the dosing bin 4. The loss-in-weight controller 5 is preferably a part of the weighting means for determining the weight of the fluidized fine-grained matter in the dosing bin 4 and used as a weighting means.

The conveyor means 6 may include a screw conveyor 12 that is in communication with the dosing bin 4 and an air-slide means 13 that is in communication with the screw conveyor 12 and that is in communication with the concentrate or matte burner 1 of the suspension smelting furnace 2.

The arrangement comprises a filling valve 7 between the fluidization arrangement 3 and the dosing bin 4 for opening and closing the communication between the fluidization arrangement 3 and the dosing bin 4 and wherein the filling valve 7 is configured to open valve when the weight of the fluidized fine-grained matter in the dosing bin 4 goes below a pre-set low limit, and by subsequently to close the filling valve 7 when the weight of the fluidized fine-grained matter in the dosing bin 4 goes above a pre-set high limit.

The arrangement comprises an impact cone 8 arranged below the filling valve 7 for distributing fluidized fine-grained matter flowing from the fluidization arrangement 3 within the dosing bin 4.

In the arrangement, the impact cone 8 may be supported from the filling valve 7, preferably at a body structure of the filling valve 7.

In the arrangement, the impact cone 8 may be supported from the filling valve 7 and the cone may be arranged below the half of the height of the dosing bin 4.

In the arrangement, the impact cone 8 may be supported from the filling valve 7 and the impact cone 8 may be supported by means of a metal support structure 9 such as a steel support structure that is attached to a body structure of the filling valve 7.

In the arrangement, the impact cone 8 may be supported from the filling valve 7 and the impact cone 8 may be hanged by metal wires such as steel wires or by metal chains such as steel chains at a body structure of the filling valve 7.

The arrangement may comprise recording means 10 for recording the actual filling time for filling the dosing bin 4, wherein the actual filling time is the time starting from opening of the filling valve 7 and ending by closing of the filling valve 7, and by comparing means 11 for comparing the recorded the actual filling time and a standard filling time for filling the dosing bin 4.

If the arrangement comprises such recording means 10 and such comparing means 11, the fluidization means of the arrangement may be configured to increase fluidization of the fine-grained matter if the recorded filling time is longer than the standard filling time.

If the arrangement comprises such recording means 10 and such comparing means 11, the fluidization means of the arrangement may be configured to decrease fluidization of the fine-grained matter or to quit fluidization of the fine-grained matter if the recorded filling time is shorter that the standard filling time.

If the arrangement comprises such recording means 10 and such comparing means 11, the comparing means 11 may be configured to use as the standard filling time a pre-determined filling time.

If the arrangement comprises such recording means 10 and such comparing means 11, the arrangement may additionally comprise calculating means for calculating an average filling time of several recorded actual filling times and the comparing means 11 may be configured to use as the standard filling time this calculated average filling time.

It is apparent to a person skilled in the art that as technology advances, the basic idea of the invention can be implemented in various ways. The invention and its embodiments are therefore not restricted to the above examples, but they may vary within the scope of the claims.

SEQUENCE LISTING

Not Applicable.

The invention claimed is:

1. An arrangement for feeding fine-grained matter to a concentrate or matte burner of a suspension smelting furnace,
wherein the arrangement comprises a feeding bin configured for feeding fine-grained matter into a fluidization arrangement,
wherein the fluidization arrangement for producing fluidized fine-grained matter and for feeding fluidized fine-grained matter into a dosing bin that is located at a level below the fluidization arrangement,
wherein the dosing bin is configured for feeding fluidized fine-grained matter to a conveyor assembly that is located at a level below the dosing bin and that is in communication with the concentrate or matte burner of the suspension smelting furnace for feeding fluidized fine-grained matter to the concentrate or matte burner of the suspension smelting furnace by means of the conveyor assembly,
wherein the arrangement comprises a loss-in-weight controller between the dosing bin and the conveyor assembly for controlling the feeding of fluidized fine-grained matter to the conveyor assembly,
wherein the arrangement comprises a scale assembly for determining the weight of the fluidized fine-grained matter in the dosing bin, and
wherein the arrangement comprises a filling valve between the fluidization arrangement and the dosing bin for opening and closing a communication between the fluidization arrangement and the dosing bin and wherein the filling valve is configured to open valve when the weight of the fluidized fine-grained matter in the dosing bin goes below a pre-set low limit, and subsequently to close the filling valve when the weight of the fluidized fine-grained matter in the dosing bin goes above a pre-set high limit,
wherein the arrangement further comprises an impact cone arranged below the filling valve for distributing fluidized fine-grained matter flowing from the fluidization arrangement within the dosing bin,
by a recorder configured for recording an actual filling time for filling the dosing bin, wherein the actual filling time is a time starting from opening of the filling valve and ending by closing of the filling valve, and
by a comparer configured for comparing the recorded actual filling time and a standard filling time for filling the dosing bin.

2. The arrangement according to claim 1, characterized by the arrangement being configured to increase fluidization of the fine-grained matter if the recorded filling time is longer than the standard filling time.

3. The arrangement according to claim 1, characterized by the arrangement being configured to decrease fluidization of the fine-grained matter if the recorded filling time is shorter than the standard filling time.

4. The arrangement according to claim 1, characterized by the standard filling time is a pre-determined filling time.

5. The arrangement according to claim 1, characterized by a calculator for calculating an average filling time of several recorded actual filling times, wherein the average filing time is the standard filling time.

6. The arrangement according to claim 1, characterized by the loss-in-weight controller being a part of a weighting means for determining the weight of the fluidized fine-grained matter in the dosing bin.

7. The arrangement according to claim 1, characterized by the impact cone being supported from the filling valve.

8. The arrangement according to claim 1, characterized by arranging the impact cone below half of the height of the dosing bin.

9. The arrangement according to claim 1, characterized by the impact cone being supported by means of a metal support structure such as a steel support structure that is attached to a body structure of the filling valve.

10. The arrangement according to claim 1, characterized by the impact cone being hanged by metal wires such as steel wires or by metal chains such as steel chains at a body structure of the filling valve.

* * * * *